March 20, 1962 — G. VIGANO — 3,025,762

CYLINDRICAL HINGE FOR SPECTACLES

Filed April 7, 1959

INVENTOR:
GIANNI VIGANO
BY
his ATTORNEY

United States Patent Office 3,025,762
Patented Mar. 20, 1962

3,025,762
CYLINDRICAL HINGE FOR SPECTACLES
Gianni Vigano, Milan, Italy, assignor to La Meccanoptica
Leonardo S.p.A., Milan, Italy, an Italian company
Filed Apr. 7, 1959, Ser. No. 804,645
Claims priority, application Italy Oct. 30, 1958
3 Claims. (Cl. 88—53)

My invention has for its object a cylindrical hinge for spectacles including two superposed coaxial cylindrical elements of equal radii mounted for angular movement with respect to each other about a common axis, each element being provided with a projection rigid therewith and having an outer side tangential to the cylindrical surface of said element. The width of each projection is equal to the combined axial length of the cylindrical elements and the portion of each projection beyond the axial length of the cylindrical element carrying it forms a tapering section having an inner cylindrical outline concentrically spaced from the outer cylindrical surface of the other hinge element so as to avoid binding therewith throughout the range of possible relative positions of the two cylindrical hinge elements.

According to a further feature of the invention, there is provided inside the two cylindrical elements a resilient member adapted to oppose yieldingly the relative rotation of the two elements throughout the range of relative angular shifting to be allowed for said elements.

This resilient member may be for instance in the shape of an annular spring arranged in a manner such that it allows the free relative rotation of the hinge elements through about 90 to 100°, whereas beyond 100° or thereabouts, the spring begins operating and opposes elastically the further shifting apart of said hinge elements.

To provide a better understanding of the invention, I will now refer to a specific embodiment which is illustrated in the accompanying drawings, wherein.

Figure 1:
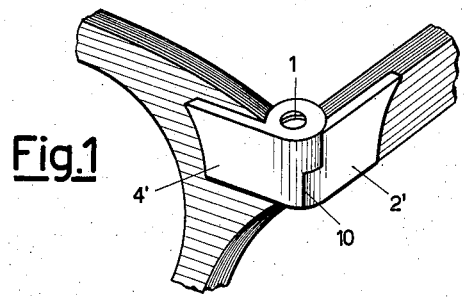
FIG. 1 is a perspective view of a hinge applied to the lens holding rim of a spectacle frame and a temple in which the projections are shown substantially at right angles to each other or in the open position.

The hinge illustrated includes two annular elements having a cylindrical periphery or cylindrical elements 2 and 4 of equal radii adapted to turn in superposed relationship round a common pivot consisting of the screw 1 locked by the nut 5. Each element is rigid with a projection 2' or 4' respectively, having an outer side tangential to the cylindrical surface of the element, and the width of each projection is equal to the combined axial length of the superposed elements 2 and 4. The portion of the projection 2' or 4' extending beyond the axial length of the element carrying it has a tapering section, 10 or 10' respectively, having an inner cylindrical outline spaced concentrically from the cylindrical surface of the other element, so as to match geometrically the outer surface of said last-mentioned hinge element.

Inside the two elements is formed a recess in which is housed a spring consisting of a split ring 3 ending with two radial terminal portions 7 and 8 projecting outwardly into the radial slots 11 and 11' formed in the cooperating transverse surfaces of the superposed hinge elements, one half of said terminal sections of the spring engaging one of said slots and the other half the other slot.

Figure 2:
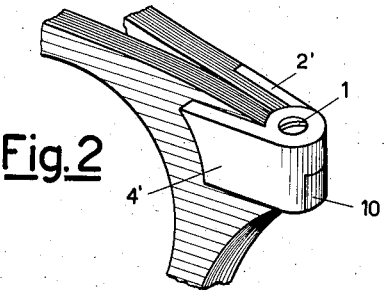
FIG. 2 is a perspective view of the same hinge in which the projections are shown substantially parallel to each other or in the collapsed position.
Figure 3:
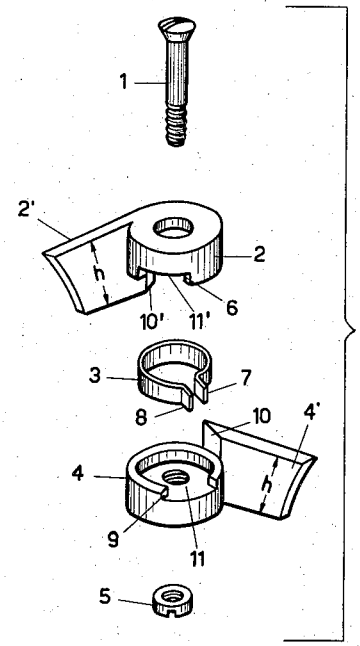
FIG. 3 is an exploded perspective view of the hinge.

Obviously, when applying the hinge to the lens holding rim of a spectacle frame, as in the case of FIGS. 1 and 2, it will be noted that the outer cylindrical surface of the hinge remains continuous and shows no ridges, whatever may be the angular shifting of the temples with reference to the lens holding rim of the spectacle frame.

Furthermore, a suitable selection of the width of the slots 11 and 11' and of the spacing between the two projections 7 and 8 of the spring allows the spring to remain inoperative for an angular shifting of the side of the spectacle rims with reference to its collapsed position by 90° for example, so that said spring may become operative only for a further angular shifting, at which moment the abutment 6 forming a side of the slot 11' in the element 2 engages the projection 7 of the spring 3, while the other projection 8 of the spring is engaged by the abutment 9 formed by the slot 11 in the other element 4. The resilient action of the spring 3 is at an end when the projections 7 and 8 engage each other at the end of the pivotal movement of the side, which movement is thus stopped.

Obviously, the spring may be given any shape differing from that illustrated and, in particular, it may consist of a coil spring. It is also possible for the spring to act, if required, in all angular positions of the elements with respect to each other, starting from the collapsed position thereof.

What I claim is:

1. A hinge for connecting a temple to the lens holding rim of a spectacle frame, said hinge comprising, in combination, a first annular element having a cylindrical periphery; a second annular element having a cylindrical periphery with a radius equal to the radius of said first mentioned periphery; pivot means coaxially received in and connecting said elements for angular movement with respect to each other; and a projection connected to the periphery of each element, one of said projections connected with the lens holding rim and the other projection connected with the temple of the spectacle frame, each said projection of a width equal to the combined axial length of said elements and each projection having an outer side tangential to the peripheries of said elements in each angular position of said elements with respect to each other.

2. A hinge for connecting a temple to the lens holding rim of a spectacle frame, said hinge comprising, in combination, a first annular element having a cylindrical periphery; a second annular element having a cylindrical periphery with a radius equal to the radius of said first mentioned periphery; pivot means coaxially reveived in and connecting said elements for angular movement with respect to each other; a projection connected to the periphery of each element, one of said projections connected with the lens holding rim and the other projection connected with the temple of the spectacle frame, each said projection of a width equal to the combined axial length of said elements and each projection having an outer side tangential to the peripheries of said elements in each angular position of said elements with respect to each other; and spring means received between said elements and surrounding said pivot means, said spring means having ends engaging with said first and second elements for yieldably biasing said elements into a predetermined angular position with respect to each other.

3. A hinge for connecting a temple to the lens holding rim of a spectacle frame, said hinge comprising, in combination, a first and a second annular element each having an end face formed with a circular recess, with a substantially segmental slot communicating with said recess, and with a pair of substantially radial shoulders constituting the lateral outlines of the respective slot, said elements having cylindrical peripheries of identical radii;

pivot means coaxially received in and connecting said elements for angular movement with respect to each other in such manner that the end face of one of said elements abuts the end face of the other element; a projection connected to the periphery of each element, one of said projections connected with the lens holding rim and the other projection connected with the temple of the spectacle frame, each said projection of a width equal to the combined axial length of said elements and each projection having an outer side tangential to the peripheries of said elements in each angular position of said elements with respect to each other; and a split ring of resilient material inserted into the recesses of said elements, said ring having two substantially radial terminal portions extending into said slots and abutting the shoulders of said elements whereby the elements are permanently biased into a position in which said slots are adjacent to each other.

References Cited in the file of this patent

UNITED STATES PATENTS

| | | |
|---|---|---|
| 1,588,807 | Powell et al. | June 15, 1926 |
| 2,094,236 | Hempel | Sept. 28, 1937 |
| 2,121,572 | Polden et al. | June 21, 1938 |

FOREIGN PATENTS

| | | |
|---|---|---|
| 19,356 | Great Britain | of 1905 |
| 236,271 | Great Britain | July 1, 1925 |
| 465,678 | Great Britain | May 13, 1937 |
| 551,160 | Italy | Nov. 16, 1956 |